(12) United States Patent
Wong

(10) Patent No.: US 12,508,795 B2
(45) Date of Patent: Dec. 30, 2025

(54) COMPOSITE THERMOFORMED TABLEWARE AND PREPARATION METHOD THEREOF

(71) Applicant: SABERT (ZHONGSHAN) LIMITED, Zhongshan (CN)

(72) Inventor: Kam Yiu Wong, Zhongshan (CN)

(73) Assignee: SABERT (ZHONGSHAN) LIMITED, Guangdong (CN)

( * ) Notice: Subject to any disclaimer, the term of this patent is extended or adjusted under 35 U.S.C. 154(b) by 370 days.

(21) Appl. No.: 18/014,956

(22) PCT Filed: Oct. 14, 2020

(86) PCT No.: PCT/CN2020/120839
§ 371 (c)(1),
(2) Date: Jan. 6, 2023

(87) PCT Pub. No.: WO2022/077257
PCT Pub. Date: Apr. 21, 2022

(65) Prior Publication Data
US 2023/0294381 A1  Sep. 21, 2023

(51) Int. Cl.
*B32B 7/12* (2006.01)
*A47G 21/00* (2006.01)
(Continued)

(52) U.S. Cl.
CPC .......... *B32B 7/12* (2013.01); *A47G 21/00* (2013.01); *B32B 7/027* (2019.01); *B32B 37/06* (2013.01);
(Continued)

(58) Field of Classification Search
CPC  B32B 7/12; B32B 7/027; B32B 37/06; B32B 37/10; B32B 38/164;
(Continued)

(56) References Cited

U.S. PATENT DOCUMENTS

2002/0015811 A1   2/2002  Gusavage

FOREIGN PATENT DOCUMENTS

| CA | 2997563 A1 * | 5/2017 | ............ B05D 3/10 |
| CN | 2346340 | 11/1999 | |

(Continued)

OTHER PUBLICATIONS

Machine translation of CN105029984A (Year: 2015).*
(Continued)

*Primary Examiner* — Vishal I Patel
(74) *Attorney, Agent, or Firm* — COZEN O'CONNOR

(57) ABSTRACT

A composite thermoformed tableware and preparation method thereof. The preparation method involves a preheating step, a compositing step and a thermoforming step in sequence; the preheating step heats multilayer forming materials at a temperature of 35° C. to 150° C., the forming materials have one or at least two of paper, plastic and (Continued)

inorganic layer; the compositing step involves stacking the preheated forming materials to form a composite material; the thermoforming step involves heat-pressing the composite material at a temperature of 80° C. to 150° C. and a pressure of 0.05 MPa to 0.5 MPa to form a three-dimensional body. The tableware is thermoformed by multiple layers of the same material or different materials, so that the thickness and strength of the tableware are higher.

7 Claims, 5 Drawing Sheets

(51) Int. Cl.
    *B32B 7/027*     (2019.01)
    *B32B 37/06*     (2006.01)
    *B32B 37/10*     (2006.01)
    *B32B 38/00*     (2006.01)
    *B32B 37/26*     (2006.01)
(52) U.S. Cl.
    CPC ............ *B32B 37/10* (2013.01); *B32B 38/164* (2013.01); *B32B 2037/268* (2013.01); *B32B 2250/02* (2013.01); *B32B 2255/12* (2013.01); *B32B 2255/26* (2013.01); *B32B 2307/546* (2013.01); *B32B 2307/7376* (2023.05); *B32B 2307/748* (2013.01)
(58) Field of Classification Search
    CPC ...... B32B 2307/7376; B32B 2037/268; B32B 2250/02; B32B 2255/12; B32B 2255/26; B32B 2307/546; B32B 2307/748; A47G 21/00

See application file for complete search history.

(56) References Cited

FOREIGN PATENT DOCUMENTS

| | | |
|---|---|---|
| CN | 2417020 | 1/2001 |
| CN | 1312158 | 9/2001 |
| CN | 104044328 | 9/2014 |
| CN | 105029984 | 11/2015 |
| CN | 205814105 | 12/2016 |
| CN | 208148728 | 11/2018 |
| CN | 110641106 | 1/2020 |
| CN | 111674099 | 9/2020 |

OTHER PUBLICATIONS

Machine translation of CN110641106A (Year: 2020).*
Machine translation of CN208148728U (Year: 2018).*
Xiao-Bo Shen (Year: 2015).*
Zhi-Lei Zhang (Year: 2020).*
Bing-rong Ma (Year: 2018).*
Masahiko Ota (Year: 2020).*
International Search Report dated Jun. 30, 2021 issued in corresponding Appln. No. PCT/CN2020/120839.
Written Opinion dated Jul. 5, 2021 issued in corresponding Appln. No. PCT/CN2020/120839.

* cited by examiner

COMPOSITE THERMOFORMED TABLEWARE AND PREPARATION METHOD THEREOF

RELATED APPLICATIONS

This is a U.S. National Phase Application under 35 USC 371 of International Application PCT/CN2020/120839 filed on Oct. 14, 2020, the entire content of which is incorporated by reference.

TECHNICAL FIELD

The invention relates to the field of tableware, in particular to a composite thermoformed tableware and preparation method thereof.

BACKGROUND ART

Molded fiber pulp tableware is popular in the market in recent years. It has the advantages and characteristics to replace part of plastic tableware. It is an environmental protective material used widely in food packaging. However, the production process of molded fiber pulp tableware is rather complicated. Generally, the raw materials need to be broken to form a pulp slurry with certain concentration, the water is sucked away by the vacuum system to form a wet mold, and then the wet mold is dried under high temperature and pressure to form a dry product. The manufacturing cost of molded fiber pulp tableware is high, with many process conditions to be matched, such as vacuum for pulp suction and high pressure for drying and forming. In addition, the thickness and strength of molded fiber pulp tableware have an important impact on the performance of the molded fiber pulp tableware. If the thickness and strength can not meet requirements, the molded fiber pulp tableware is easy to collapse and has difficulty to hold food.

Plastic tableware is a kind of material commonly used in foodservice industry, which can directly contact with food. With the increasing awareness of environmental protection, people realize that most of the plastic tableware used in the market is not biodegradable, such as PP, PET, PE, etc., and the cost of most of the plastic tableware production is high. At present, also there is tableware made of degradable plastics, such as PLA tableware, which has industrial degradability, but its price is high and its utilization rate in the market is relatively low.

SUMMARY OF INVENTION

Technical Problem

The first object of the invention is to provide a preparation method of composite thermoformed tableware with simple preparing process, low cost and easy control of thickness and strength.

The second object of the invention is to provide composite thermoformed tableware prepared by the preparation method mentioned above.

Technical Solution

In order to achieve the first object mentioned above, the preparation method of composite thermoformed tableware provided by the invention comprises a preheating step, a compositing step and a thermoforming step in sequence; the preheating step comprises heating multilayer forming materials at a temperature of 35° C. to 150° C., and the forming materials comprise one or at least two kinds of materials from paper, plastic and inorganic layer; the compositing step comprises stacking the preheated forming materials to form a composite material; the thermoforming step comprises heat-pressing the composite material at a temperature of 80° C. to 150° C. and a pressure of 0.05 MPa to 0.5 MPa to form a three-dimensional body.

As a further solution, the forming material is self-adhesive, and the forming material is in a half molten state in the preheating step, and is in a half molten state to be bonded with another forming material in the compositing step.

As a further solution, in the preheating step, an adhesive is coated between two adjacent forming materials; the adhesive comprises by mass 20% to 50% homopolyacrylate and 50% to 80% silica pigment, or the adhesive comprises by mass 50% to 95% PVA and 5% to 50% starch, and the coating weight of the adhesive is 3 g/m$^2$ to 15 g/m$^2$.

As a further solution, after the thermoforming step, a grease proof layer is coated on the surfaces of the three-dimensional body, the grease proof layer comprises by mass 1% to 50% starch, 50% to 98% polyacrylate emulsion and 1% to 3% alkyl ketene dimer emulsion, and the coating weight of the grease proof layer is 0.1 g/m$^2$ to 2 g/m$^2$.

As a further solution, the preparation method comprises a drying step, which is carried out between the preheating step and the thermoforming step, and the drying step comprises drying the composite material at a drying temperature of 100° C. to 200° C.

As a further solution, the composite thickness of the three-dimensional body is 100 μm to 10 mm, the bending resistance force of the three-dimensional body is 0.9 kgf to 2.0 kgf, and the plybond strength of the three-dimensional body is greater than 120J/m$^2$.

As a further solution, the preparation method is carried out by a compositing machine, which comprises a transferring mechanism, a preheating zone, a compositing zone and a thermoforming zone; the transferring mechanism comprises at least two unwinding devices, the preheating zone comprises at least two heating rollers, the compositing zone comprises a plurality of pressing rollers, and the thermoforming zone comprises a molding device; the forming materials are transferred to the preheating zone by the unwinding devices, the heating rollers heat the forming materials, the pressing rollers combine the multilayer forming materials, and the molding device carries out thermoforming on the composite material.

In order to achieve the second object mentioned above, the composite thermoformed tableware provided by the invention is prepared by the above preparation method, the tableware comprises at least two layers of forming materials, the forming materials are stacked to form a composite structure, and the forming materials comprise one or at least two kinds of materials from paper, plastic and inorganic material.

As a further solution, an adhesive is disposed between two adjacent layers of the forming materials, the adhesive comprises by mass 20% to 50% homopolyacrylate and 50% to 80% silica pigment, or the adhesive comprises by mass 50% to 95% PVA and 5% to 50% starch, and the coating weight of the adhesive is 3 g/m$^2$ to 15 g/m$^2$; a grease proof layer is coated on the surfaces of the tableware, the grease proof layer comprises by mass 1% to 50% starch, 50% to 98% polyacrylate emulsion and 1% to 3% alkyl ketene dimer emulsion, and the coating weight of the grease proof layer is 0.1 g/m$^2$ to 2 g/m$^2$.

As a further solution, the tableware comprises a handle and a main part, the handle and the main part are integrally formed and connected, and an inner arc is formed at the corner between the handle and the main part.

Beneficial Effect

Tableware is thermoformed by multiple layers of the same material or different materials, resulting in higher thickness and higher strength of the tableware. In the preheating step, heating makes self-adhesive materials sticky to be bonded with other forming materials, or heating reduces the moisture of the composite material so as to improve the liquid absorption of the composite material and facilitate the adhesive to bond the composite material better. The preparation method obtains the product by preheating first and thermoforming later, the product surface is smooth without wrinkles, the operation process is simple and does not need complex and complicated procedures, and the production cost can be better controlled.

Among them, the preheating step makes self-adhesive forming materials sticky, which makes the forming materials and other forming materials more convenient and rapid to be bonded and stacked to form a composite structure.

Or, an adhesive is used to bond non-sticky forming materials to form a composite structure, ensuring the thickness of the product and the bond strength of the composite material so as to avoid delamination of the final tableware product.

In addition, a grease proof layer is added to make the tableware have good water proof and grease proof properties, so as to avoid leakage of the tableware when the tableware with food is heated; moreover, the grease proof layer does not contain fluorine and PFAS ingredients, which satisfies food safety requirements better and is environmentally friendly.

Furthermore, the drying step before the thermoforming step can control the moisture of the composite material better, improve the liquid absorption of the composite material, and make the composite material more evenly absorb the adhesive, ensuring the plybond strength between the layers of the composite, and improving the body forming rate.

Moreover, the composite thickness of the three-dimensional body is 100 μm to 10 mm, the tableware with this thickness and strength can ensure that the daily use performance of tableware meet the requirements of consumers, and the use experience is better.

Furthermore, the automatic production of tableware is achieved through the compositing machine, which further simplifies the preparation process of the tableware and effectively improves the production efficiency.

The present invention is further described with the attached drawings and embodiments.

DESCRIPTION OF EMBODIMENTS

The composite thermoformed tableware comprises at least two layers of forming materials, which are stacked to form a composite structure, and the forming materials comprise one or at least two kinds of materials from paper, plastic and inorganic materials. In the preparation process, if the forming material is self-adhesive, preheating the forming material will make the forming material sticky, which is convenient to be bond with another forming material to form a composite structure. If the forming material is not self-adhesive, an adhesive is disposed between two adjacent layers of forming materials. The adhesive comprises by mass 20% to 50% homopolyacrylate and 50% to 80% silica pigment, or the adhesive comprises by mass 50% to 95% PVA and 5% to 50% starch. the coating weight of the adhesive is 3 g/m² to 15 g/m². The surfaces of the tableware are coated with a grease proof layer. The grease proof layer comprises by mass 1% to 50% starch, 50% to 98% polyacrylate emulsion and 1% to 3% alkyl ketene dimer emulsion AKD, and the coating weight of the grease proof layer is 0.1 g/m² to 2 g/m².

Figure 1:
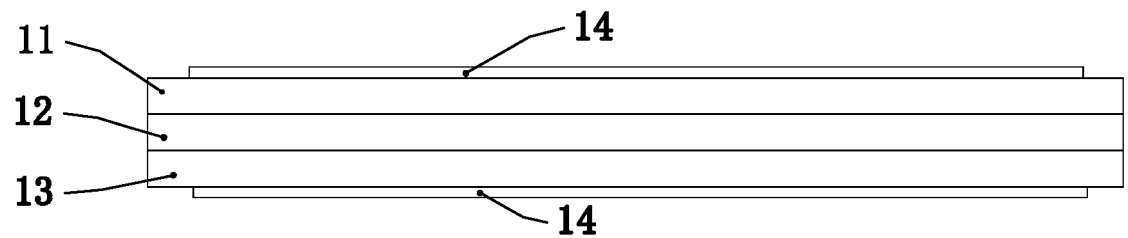
FIG. 1 is a composite structure view of a first example of the environmental protective composite thermoformed tableware of the present invention.

Referring to FIG. 1, the tableware 1 of the first example comprises a first forming material 11, a second forming material 12 and a third forming material 13. The first forming material 11, the second forming material 12 and the third forming material 13 are stacked in a vertical direction in a layer-by-layer manner. Among them, the second forming material 12 at the middle layer is self-adhesive, and the forming materials of adjacent layers are directly bonded. The inner surface and outer surfaces of the tableware are respectively coated with a grease proof layer 14.

Figure 2:
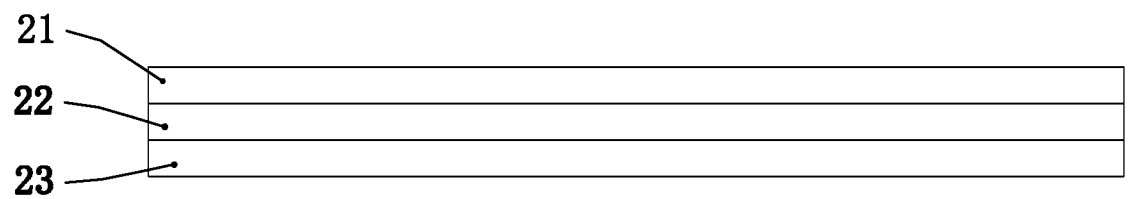
FIG. 2 is the composite structure view of a second example of the environmental protective composite thermoformed tableware of the present invention.

Referring to FIG. 2, the tableware of the second example comprises a first forming material 21, a second forming material 22 and a third forming material 23. The first forming material 21, the second forming material 22 and the third forming material 23 are stacked in a vertical direction in a layer-by-layer manner, the second forming material 22 at the middle layer is self-adhesive, and the forming materials of adjacent layers are directly bonded. There is no grease proof layer on the inner and outer surfaces of the tableware.

Figure 3:
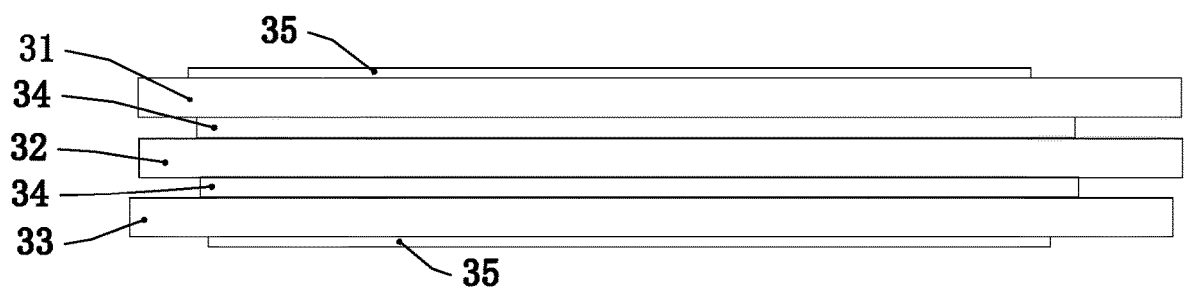
FIG. 3 is the composite structure view of a third example of the environmental protective composite thermoformed tableware of the present invention.

Referring to FIG. 3, the tableware of the third example comprises a first forming material 31, a second forming material 31 and a third forming material 31, and the first forming material 31, the second forming material 32 and the third forming material 33 are stacked in a vertical direction in a layer-by-layer manner. The forming material of each layer is not self-adhesive, and there is an adhesive layer 34 between adjacent layers of the forming materials. The inner surface and the outer surface of the tableware are respectively coated with a grease proof layer 35.

Figure 4:
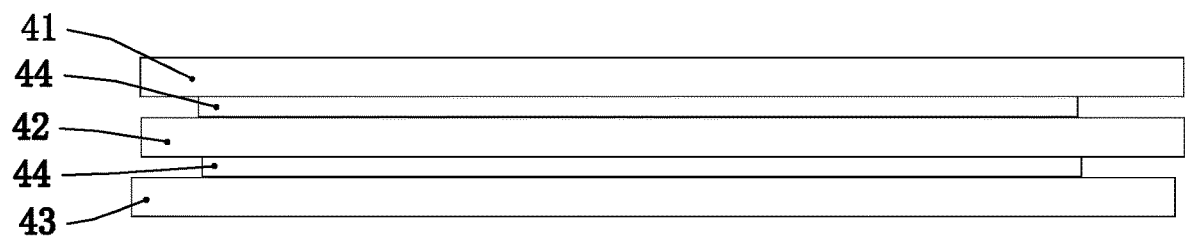
FIG. 4 is the composite structure view of a fourth example of the environmental protective composite thermoformed tableware of the present invention.

Referring to FIG. 4, the tableware of the fourth example comprises a first forming material 41, a second forming material 42 and a third forming material 43, and the first forming material 41, the second forming material 42 and the third forming material 43 are stacked in a vertical direction in a layer-by-layer manner. The forming material of each layer is not self-adhesive, and there is an adhesive layer 44 between adjacent layers of the forming materials. The inner and outer surfaces of tableware are not coated with grease proof layer.

The tableware structures of the first example to the fourth example can be used for different kinds of tableware, and can be used in direct contact with dry food, wet food and oily food. In the process of tableware preparation, whether to coat grease proof layer on the three-dimensional body can be determined according to the final performance requirement of the tableware. If the tableware is not required to have water proof and grease proof properties, it is not necessary to coat the three-dimensional body with grease proof layer. If the tableware is required to have water proof and grease proof properties, the three-dimensional body may be coated with grease proof layers.

Figure 5:
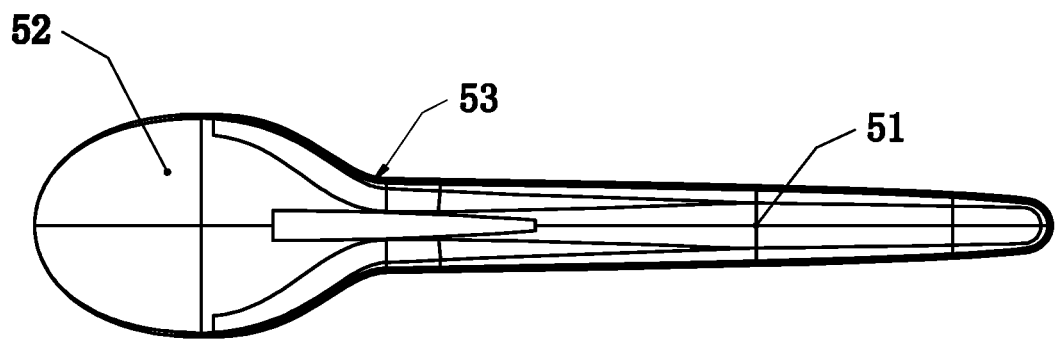
FIG. 5 is the front view of the environmental protective composite thermoformed tableware of the present invention when it is a spoon.
Figure 6:
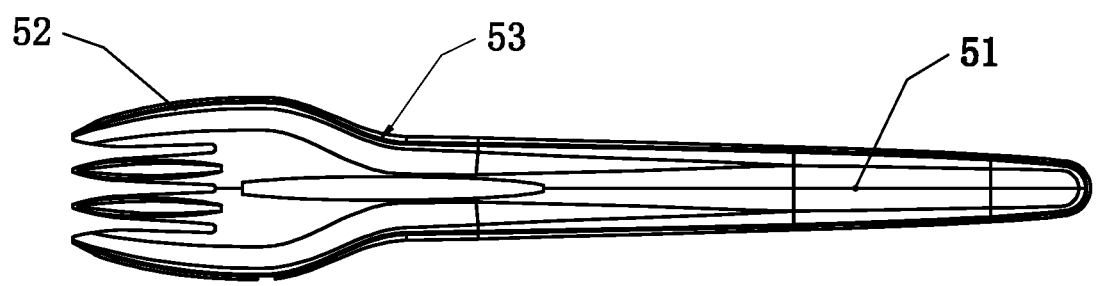
FIG. 6 is the front view of the environmental protective composite thermoformed tableware of the present invention when it is a fork.
Figure 7:
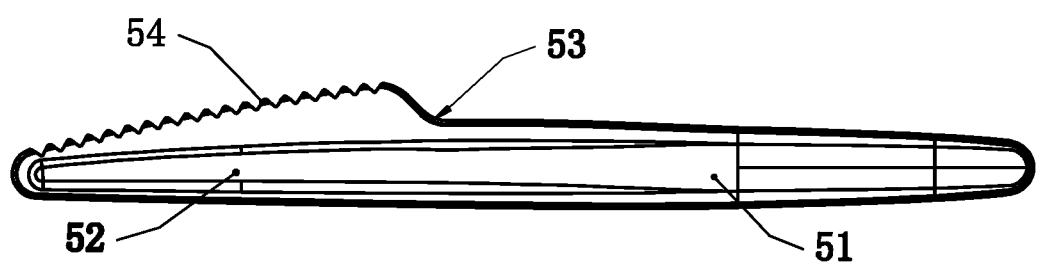
FIG. 7 is the front view of the environmental protective composite thermoformed tableware of the present invention when it is a knife.

Referring to FIG. 5, the tableware can be a spoon, which comprises a handle 51 and a main part 52, and the handle 51 and the main part 52 are integrally formed and connected. A corner 53 is formed between the handle 51 and the main part 52, the corner 53 has an inner arc, and the inner arc is concaved towards the inner of the tableware. The inner arc with a certain radius of curvature is formed between the handle 51 and the main body 52, so as to avoid cracks at the corner of the molded product. Referring to FIG. 5, when the tableware is a spoon, the main part 52 is an oval-like concave supporting block, which can hold a small amount of liquid and solid. Referring to FIG. 6, when the tableware is a fork, the main part 52 is of the shape of a fork, and the corner 53 between the handle 51 and the main part 52 forms an inner arc. Referring to FIG. 7, when the tableware is a knife, a plurality of saw teeth 54 are formed on the main part 52, and the corner 53 between the handle 51 and the main part 52 forms an inner arc. Besides spoon, fork and knife, tableware may also be a bowl, a dish or a plate.

The forming materials are selected from one or at least two kinds of materials from paper, plastic and inorganic material, among which the plastic includes common plastic and bioplastic. Therefore, the forming materials can be selected from one or at least two kinds of materials from paper, common plastic, bioplastic and inorganic material. The main material of paper is plant fiber. Paper, bioplastic and inorganic material are degradable and environmentally friendly. Preferably, when one of the forming materials is a common plastic, another forming material is a degradable material.

The specific characteristics of paper are shown in Table 1.

TABLE 1

| | |
|---|---|
| Grammage | 250 g/m² to 450 g/m² |
| Thickness | 250 μm to 530 μm |
| Number of layers | 1 to 5 |
| Texture | Plant fiber (including 50% to 90% short fibers and 10% to 50% long fibers) |
| Moisture | 7% to 10% |
| Cobb value (30 s) | <50 g/m² |
| Edge wick (30 min, 95° C.) | <2.0 mm |
| Coating material | None or PLA or PBAT or PE |
| Special requirements | Non-fluorescent, food grade |

In Table 1, the number of layers of paper is 1 to 5, so that in the tableware, one layer of paper forming material has a structure formed by stacking 1 to 5 layers of paper, so as to further ensure the thickness and strength of tableware. As the forming materials for preparing tableware can be purchased as the finished products in the market and the finished products have 1 to 5 layers of paper, by purchasing forming material with stacking multiple layers and stacking it again for compositing, the strength of tableware is better and the preparation process is simpler.

Paper may comprise a first plant fiber and a second plant fiber, the first plant fiber is one of wood pulp, bagasse pulp and wheat straw pulp, and the second plant fiber is one of reed pulp, bamboo pulp and palm pulp.

The specific characteristics of bioplastics are shown in Table 2.

TABLE 2

| Material | PLA | PBAT | PBS | PBSA |
|---|---|---|---|---|
| Grammage(g/m²) | 10 to 200 | 10 to 200 | 10 to 200 | 10 to 200 |
| Thinkness(mm) | 0.5 to 10 | 0.5 to 10 | 0.5 to 10 | 0.5 to 10 |
| Density | 0.91 | 0.905 | 0.9 | 0.9 |
| Tensile strength(MPa) | 40 | 40 | 56 | 53 |
| Elongation | 500% | 450% | 460% | 430% |
| Melting point(° C.) | 120 | 115 | 140 | 145 |

Each layer of bioplastic can be selected from one of PLA, PBAT, PBS or PBSA. The bioplastics are biodegradable, and the tableware obtained is more environmentally friendly.

The specific characteristics of common plastics are shown in Table 3.

TABLE 3

| Material | PP | PET | PS | PE | PVDC |
|---|---|---|---|---|---|
| Grammage (g/m²) | 10 to 200 | 10 to 200 | 10 to 200 | 10 to 200 | 10 to 200 |
| Thickness(mm) | 0.5 to 10 | 0.5 to 10 | 0.5 to 10 | 0.5 to 10 | 0.5 to 10 |
| Density | 0.905 | 0.91 | 0.9 | 0.9 | 0.91 |
| Tensile strength (MPa) | 44 | 46 | 43 | 60 | 56 |
| Elongation | 850% | 800% | 500% | 900% | 650% |
| Melting point (° C.) | 132 | 180 | 150 | 100 | 120 |

The specific characteristics of inorganic materials are shown in Table 4.

TABLE 4

| Material | Talc | Calcium carbonate | Kaolin | Calcined soil |
|---|---|---|---|---|
| Grammage (g/m²) | 100 to 250 | 100 to 250 | 100 to 250 | 100 to 250 |
| Thickness (mm) | 1 to 10 | 1 to 10 | 1to 10 | 1 to 10 |
| Moisture | 1% | 1% | 1.5% | 1% |
| Granularity −2 μm % | 85.0 to 95.0 | 88.0 to 94.0 | 96.0 to 100.0 | 85.0 to 92.0 |
| ISO whiteness(%) | 88.5 ± 1.5 | 92.0 to 97.0 | 88.5 ± 1.5 | 93.0 ± 2.0 |

In the process of tableware preparation, inorganic materials are integrated into plate shape to facilitate the adhesion of inorganic materials on other forming materials.

If one of the forming materials of the tableware is self-adhesive, it can be bonded between layers without using adhesive. The self-adhesive forming materials include PLA, PBAT, PE, PP, PET, PVDC, PBS, etc.

If the forming material of each layer is not self-adhesive, an adhesive is disposed between two adjacent layers of the forming materials, and the adhesive plays a bonding role to bond forming materials of the two adjacent layers. The adhesive comprises by mass 20% to 50% homopolyacrylate and 50% to 80% silica pigment, and the coating weight of the adhesive is 3 g/m² to 15 g/m². Preferably, the adhesive comprises 30% homopolyacrylate and 70% silica pigment, and the coating weight of the adhesive is 8 g/m². As another embodiment, the adhesive comprises by mass 50% to 95% PVA and 5% to 50% starch.

The specific characteristics of adhesive are shown in Table 5.

TABLE 5

| | |
|---|---|
| Solid content | 52% to 55% |
| Viscosity (2#rotor, 100 rpm, 20° C.) | 150 mPa · s to 350 mPa · s |
| Density | 1.15 g/cm³ |

The grease proof layer comprises by mass 1% to 50% starch, 50% to 98% polyacrylate emulsion and 1% to 3% alkene ketene dimer emulsion, and the coating weight of the grease proof layer is 0.1 g/m² to 2 g/m². Preferably, the grease proof layer comprises 20% to 50% starch, 48% to 78% polyacrylate emulsion and 2% alkyl ketene dimer emulsion, and the coating weight of the grease proof layer is 1 g/m². The grease proof layer can be disposed on the inner and outer surfaces of the tableware at the same time.

The specific characteristics of starch in grease proof layer are shown in Table 6.

TABLE 6

| | |
|---|---|
| Concentration | 5% to 15% |
| Viscosity (2#rotor, 60 rpm, 25° C.) | 20 mPa · s to 150 mPa · s |

The characteristics of polyacrylate emulsion in the grease proof layer are shown below in Table 7.

TABLE 7

| Characteristics | Characteristic value |
|---|---|
| Solid content | 20% to 23% |
| pH | 5.0 to 7.0 |
| Density | 1.02 g/ml to 1.10 g/ml |
| Molecular weight | 50,000 to 350,000 |
| Viscosity | 50 mpa · s to 200 mpa · s |
| Average particle size | 50 nm to 100 nm |

The specific characteristics of alkyl ketene dimer emulsion (AKD) in the grease proof layer are shown in Table 8.

TABLE 8

| Characteristics | Characteristic value |
|---|---|
| Solid content | 14% to 16% |
| pH | 3.0 to 5.0 |
| Density | 1.02 g/ml to 1.10 g/ml |
| Ionicity | Cationic |
| Molecular weight | 50,000 to 350,000 |
| Viscosity | 10 mpa · s to 20 mpa · s |
| Average particle size | 0.5 µm to 2 µm |

Figure 8:
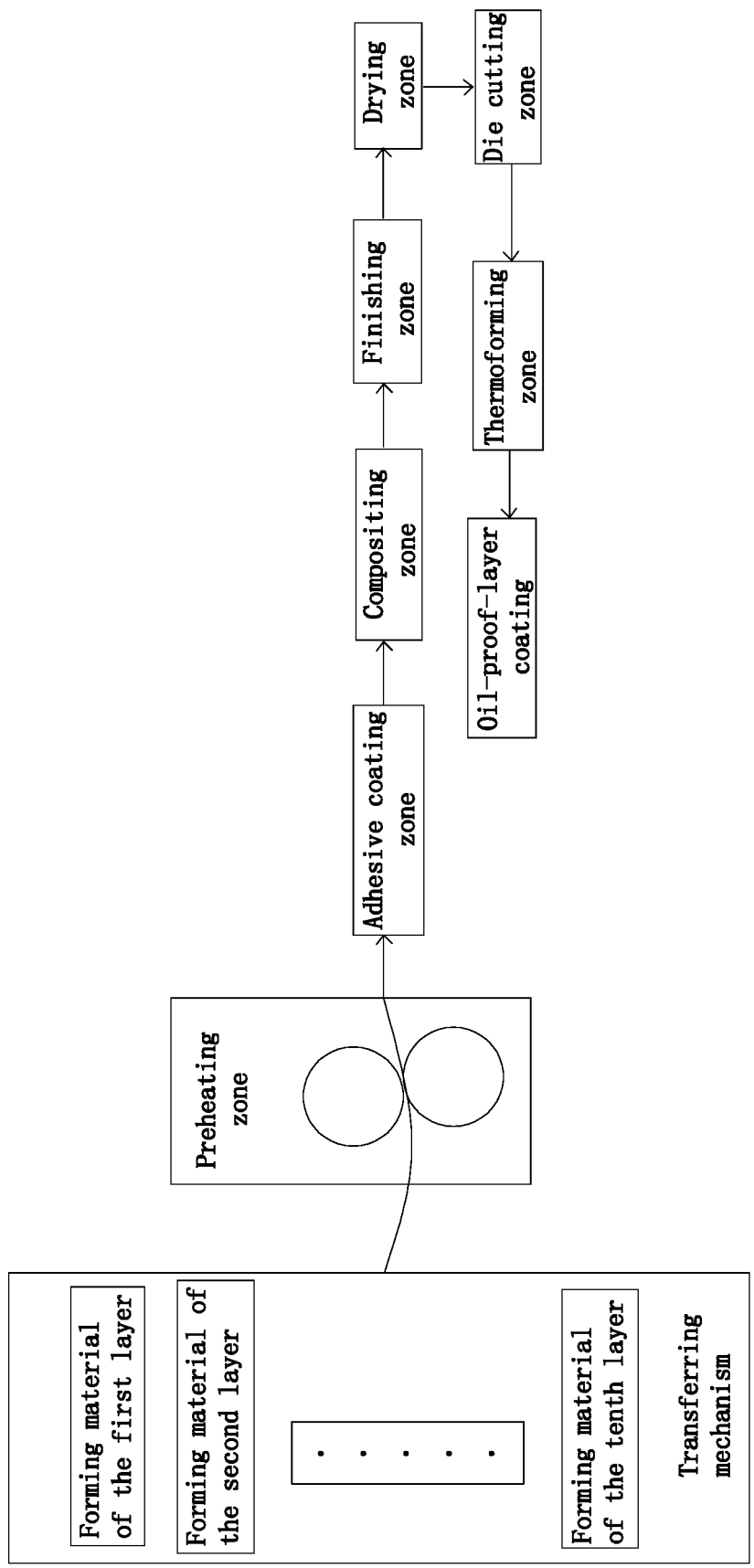
FIG. 8 is the flow chart of an example of preparation method of the environmental protective composite thermoformed tableware of the present invention.

Referring to FIG. 8, the preparation method of the composite thermoformed tableware comprises the following steps in sequence: a preheating step, an adhesive coating step, a compositing step, a finishing step, a drying step, a die cutting step, a thermoforming step and a grease-proof-layer coating step. The composite thermoformed tableware of the invention is composited by a compositing machine, and corresponding to the steps, the compositing machine are provided with a transferring mechanism, a preheating zone, an adhesive coating zone, a compositing zone, a finishing zone, a drying zone, a die cutting zone and a thermoforming zone. The transferring mechanism comprises at least two unwinding devices, and the forming material in the form of a reel is transferred by rolling the unwinding device. The adhesive coating zone comprises a plurality of coating rollers coated with adhesive. The compositing zone comprises one or more pressing rollers, and the multilayer forming materials pass through the pressing rollers. The finishing zone comprises a plurality of grinding devices. The drying zone comprises a plurality of drying devices. The die cutting one comprises a die cutting device which is used to cut the composite material. The thermoforming zone comprises a molding device, which is used to heat-press the composite material of a certain size.

The preheating step is as follows: the multilayer forming materials are transferred to the preheating area by a plurality of unwinding devices, and one forming material layer corresponds to one unwinding device. In the preheating zone, the surface of each forming material layer is heated at a temperature of 35° C. to 150° C. by a heating roller to a set temperature of 100° C. to 200° C. The heating temperature can be adjusted according to the forming material; preferably, the heating temperature is 150° C., and the heating manner can be hot oil heat exchange or steam heat exchange.

If the forming material is self-adhesive, there is no need to carry out the adhesive coating step. After the preheating step, the surface of the forming material is in a half molten state, and the forming materials are directly combined.

If the forming material is not self-adhesive, the forming material needs to be coated with adhesive before the compositing step. The adhesive coating steps are as follows: coating the outer surface of the first coating roller with adhesive, contacting the bonding surface of the composite material with the outer surface of the first coating roller, so that the adhesive is applied to the bonding surface of the composite material, and the bonding surface is bonded with another forming material with the adhesive.

The compositing step is as follows: when the multilayer forming materials passes through the pressing rollers, the multilayer forming materials are bonded under the pressure of the pressing roller to form a composite material. In the above compositing steps, the number of layers of forming materials can be 2 to 10, the conveying speed of pressing roller is 30m/min to 150m/min, and the pressing pressure of pressing roller is 10 psi to 200 psi. The thickness of the composite material is 100 µm to 10 mm, and the plybond strength of the composite material is more than 120J/m². The adhesive comprises by mass 20% to 50% homopolyacrylate and 50% to 80% silica pigment, and the coating weight of the adhesive is 3 g/m² to 15 g/m²; or the adhesive comprises 50% to 95% PVA and 5% to 50% starch.

The finishing step is as follow: polishing or printing on the composite materials by finishing tools in the finishing zone.

The drying step is as follows: the composite material is dried in the drying zone, the drying temperature is 100° C. to 200° C., and the heating manner is hot oil heat exchange or steam heat exchange.

The die cutting step is as follows: the die cutting device cuts the composite material to form a plurality of small pieces of a certain size.

The thermoforming step is as follows: after the composite material is cut into the required size by die cutting, the composite material enters into the thermoforming zone, and the molding device with set shape such as a mold with specific shape is used in the thermoforming zone for heat-pressing forming, so as to form a three-dimensional body. In the thermoforming process, the heat pressing speed is 60 pcs/min, the heat pressing temperature is 80° C. to 150° C., the heat pressing pressure is 0.05 MPa to 0.5 MPa, the heat pressing time is 0.5 s to 2 s, and the heating manner is electric heating. Preferably, the heat pressing temperature is 100° C., the heat pressing pressure is 0.15 MPa, and the heat pressing time is 1.5 s.

After the thermoforming process, a three-dimensional body can be obtained. According to the required final properties of the tableware, the tableware can be coated with a grease proof layer, so that the tableware has water proof and grease proof properties. Otherwise it may not be coated with grease proof layer. The coating step comprises immersing the three-dimensional body in a container with grease proof agents, so that a coating layer is formed at the inner and outer surfaces of the body. The grease proof layer comprises by mass 20% to 50% starch, 48% to 78% polyacrylate emulsion and 2% alkyl ketene dimer emulsion, the coating weight of the grease proof layer is 1 g/m², and the coating time is 1 s to 5 s. After the coating of grease proof layer is completed, the tableware coated with grease proof agent is dried at 100° C. to 180° C. and the drying time is 5 s to 10 s.

As shown in FIG. 8, after the preheating step and the compositing step are completed, the die cutting step and the thermoforming step of the composite material can be carried out directly.

The composite thermoformed tableware of the invention can show its properties by testing its water resistance, grease resistance, bending resistance force and plybond strength.

The water resistance test is to test the resistance of tableware to water immersion at 85° C. The specific testing method is as follows: immersing the tableware in 85° C. water, and taking out the tableware at set intervals to observe water penetration. If there is penetration, the immersion time is the time of the tableware's resistance to water immersion.

The grease resistance test is to test the resistance of tableware to oil immersion at 85° C. The specific testing method is as follows: immersing the tableware in 85° C. oil, and taking out the tableware at set intervals to observe oil penetration. If there is penetration, the immersion time is the time of the tableware's resistance to oil immersion.

The bending resistance force test kgf is used for indicating the maximum pressure that the tableware can bear; the higher the value, the stronger the resistance of the product to bending and breaking. The bending resistance force test before immersion is continuously adding load to the tableware, and when the tableware is bent, the load on the tableware is the maximum pressure that the tableware can bear. The bending resistance force test after immersion is the maximum pressure that the tableware can bear after 10 minutes of water immersion.

The plybond strength of the product is used for indicating the adhesive force between layers of the tableware; the higher the value, the stronger the adhesive force between layers of the product and the stronger the resistance to delamination. The test method of plybond strength of the product can be in accordance with the test method described in International Standard of American Paper Industry TAPPI T569.

The present invention is further described with specific embodiments to better understand the invention.

16 embodiments and 5 comparisons are provided in the invention. The preparation methods of the 16 embodiments are basically the same, and the differences are shown in the following tables. See Table 9 for the selection of forming material of each layer and components of adhesive and grease proof layer in embodiments 1 to 10, and table 10 for selection of forming material of each layer and components of adhesive and grease proof layer in embodiments 11 to 13, table 11 for selection of forming material of each layer and components of adhesive and grease proof layer in embodiments 14 to 16, and table 12 for selection of materials in comparisons 1 to 5. The number of bonded layers in the above tables is not equal to the number of layers using adhesive. Because some forming materials are self-adhesive, the self-adhesive forming material and its adjacent forming material do not need adhesive. For example, in some embodiments, the coating weight of adhesive is 0 g/m².

TABLE 9

| Structure | Embodiment | | | | | | | | |
|---|---|---|---|---|---|---|---|---|---|
| | 1 | 2 | 3 | 4 | 5 | 6 | 7 | 8 | 9 |
| Outer layer | Paper | Paper | Paper | Paper | Paper | Paper | Paper | Paper | Paper |
| Core layer 1 | Bio-plastic | Inorganic material | Common plastic | Paper | Paper | Paper | Paper | Paper | Paper |
| Core layer 2 | / | / | / | / | Inorganic material | / | / | / | / |
| Outer layer | Paper | Paper | Paper | Paper | Paper | Paper | Paper | Paper | Paper |
| Grammage of materials | 350 | 250 | 300 | 350 | 370 | 250 | 300 | 350 | 370 |
| Number of bonded layers | 3 | 3 | 3 | 3 | 4 | 3 | 3 | 3 | 3 |
| Coating weight of adhesive (g/m²) | / | 8 | / | 8 | 8 | 8 | 8 | 8 | 8 |
| Starch content of grease proof layer | 15% | 20% | 25% | 30% | 30% | / | / | / | / |

TABLE 9-continued

| Structure | Embodiment 1 | 2 | 3 | 4 | 5 | 6 | 7 | 8 | 9 |
|---|---|---|---|---|---|---|---|---|---|
| Polyacrylate emulsion content | 84% | 79% | 74% | 68% | 68% | / | / | / | / |
| AKD content | 1% | 1% | 2% | 2% | 2% | / | / | / | / |

TABLE 10

| Structure | Embodiment 10 | Embodiment 11 | Embodiment 12 | Embodiment 13 |
|---|---|---|---|---|
| Outer layer | Bioplastic | Bioplastic | Bioplastic | Bioplastic |
| Core layer1 | Inorganic material | Paper | Paper | Paper |
| Core layer2 | / | / | / | Inorganic material |
| Outer layer | Paper | Paper | Bioplastic | Bioplastic |
| Grammage of materials | 350 | 350 | 370 | 350 |
| Number of bonded layers | 3 | 3 | 3 | 4 |
| Coating weight of adhesive (g/m$^2$) | 8 | 5 | / | 5 |
| Starch content of grease proof layer | 30% | 50% | 15% | 30% |
| Polyacrylate emulsion content | 68% | 47% | 84% | 68% |
| AKD content | 2% | 3% | 1% | 2% |

TABLE 11

| Structure | Embodiment 14 | Embodiment 15 | Embodiment 16 |
|---|---|---|---|
| Outer layer | Common plastic | Common plastic | Common plastic |
| Core layer1 | Paper | Paper | Paper |
| Core layer2 | / | / | Inorganic material |
| Outer layer | Paper | Common plastic | Common plastic |
| Grammage of materials | 350 | 350 | 370 |
| Number of bonded layers | 3 | 3 | 4 |
| Coating weight of adhesive (g/m2) | 8 | / | 8 |
| Starch content of grease proof layer | 50% | 30% | 30% |
| Polyacrylate emulsion content | 47% | 68% | 68% |
| AKD content | 3% | 2% | 2% |

TABLE 12

| | Comparison 1 | Comparison 2 | Comparison 3 | Comparison 4 | Comparison 5 |
|---|---|---|---|---|---|
| Material | Common single-layer paper-board tableware on the market | PET | PP | PLA | Molded fiber pulp tableware |

The tableware of embodiments 1 to 16 and comparisons 1 to 5 were tested. The property test results of the tableware of embodiments 1 to 16 and the property test results of tableware of comparisons 1 to 5 are shown in table 13.

TABLE 13

| | Product quality assessment | | | | |
|---|---|---|---|---|---|
| | Water resistance | Grease resistance | Bending resistance force test(kgf) before immersion | Bending resistance force test(kgf) after immersion | Plybond strength (J/m$^2$) |
| Embodiment 1 | >30 min | >30 min | 0.9 | 0.7 | 90 |
| Embodiment 2 | 25 min | >30 min | 0.7 | 0.45 | 105 |
| Embodiment 3 | 22 min | 25 min | 0.85 | 0.5 | 84 |
| Embodiment 4 | >30 min | >30 min | 1.5 | 1.26 | 135 |
| Embodiment 5 | >30 min | >30 min | 2.5 | 1.8 | 95 |
| Embodiment 6 | 5 min | 1 min | 0.7 | 0.25 | 136 |
| Embodiment 7 | 5 min | 1 min | 0.8 | 0.32 | 131 |
| Embodiment 8 | 4.5 min | 1 min | 0.95 | 0.35 | 125 |
| Embodiment 9 | 4.5 min | 1 min | 1.1 | 0.42 | 128 |
| Embodiment 10 | >30 min | >30 min | 1.1 | 0.98 | 127 |
| Embodiment 11 | 8 min | 15 min | 1.3 | 0.84 | 108 |
| Embodiment 12 | >30 min | >30 min | 1.3 | 1.15 | 114 |
| Embodiment 13 | >30 min | >30 min | 2.0 | 1.3 | 115 |
| Embodiment 14 | 10 min | 25 min | 1.2 | 0.94 | 125 |
| Embodiment 15 | >30 min | >30 min | 0.75 | 0.40 | 121 |
| Embodiment 16 | >30 min | >30 min | 0.95 | 0.55 | 119 |
| Comparison 1 | <20 min | <15 min | 0.6 | 0 | 74 |
| Comparison 2 | >30 min | >30 min | 1.2 | 1.2 | / |
| Comparison 3 | >30 min | >30 min | 1.0 | 1.0 | / |
| Comparison 4 | >30 min | >30 min | 0.9 | 0.9 | / |
| Comparison 5 | >30 min | >30 min | 1.0 | 0.3 | 156 |

As can be seen from tables 9 to 13, comparing the tableware in embodiment 4 with that in embodiment 5, the number of bonded layers of the tableware in embodiment 4 is different from that in embodiment 5, 3 layers in embodiment 4 and 4 layers in embodiment 5. Comparing the tableware in embodiment 10 with that in embodiment 13, the number of bonded layers of the tableware in embodiment 10 is different from that in embodiment 13, 3 layers in embodiment 10 and 4 layers in embodiment 13. Comparing the tableware in embodiment 15 with that in embodiment 16, the number of bonded layers of the tableware in embodiment 15 is different from that in embodiment 16, 3 layers in embodiment 15 and 4 layers in embodiment 16. The water and grease resistance of the tableware with four-layer forming materials is similar to that of the tableware with three-layer forming materials. The bending resistance force of the tableware with four-layer forming materials is better than that of the tableware with three-layer forming materials, but the plybond strength of the tableware with three-layer forming materials is better than that of the tableware with four-layer forming materials. Therefore, the plybond strength of the tableware with three-layer forming materials is better, and the tableware preferably has three layers of forming materials.

Comparing embodiment 10 with embodiment 13, the amount of adhesive in the two embodiments is different. Increasing the coating weight of the adhesive can improve the plybond strength of the product and enhance the water and grease resistance of the product at the same time. The coating weight of the adhesive of 8 g/m$^2$ is based on the stable parameters provided by the coating production equipment.

The tableware in embodiments 6 to 9 does not have grease proof layer. Comparing the tableware of embodiments 6 to 9 with the tableware of embodiment 4, the bending resistance force of tableware without grease proof layer is obviously lower than that of tableware with grease proof layer, which indicates that the grease proof layer can reduce the penetration of the tableware.

Comparing embodiment 1 with embodiment 3, embodiment 2 with 4, and embodiment 14 with embodiment 15, increasing the proportion of starch used in the grease proof layer can improve the bending resistance force of the product, but if the proportion is increased excessively, the water resistance of the product will decrease. A proper amount can satisfy the two properties.

Comparing embodiments 1 to 16 with comparison 1, the tableware of embodiments 1 to 16 has high stiffness bending resistance force and plybond strength, which is superior to the common single-layer paper-board tableware on the market. Comparing embodiments 1 to 16 with comparisons 2 to 4, the stiffness bending resistance force of the tableware in embodiments 1 to 16 is comparable to the existing plastic tableware, and the properties of some embodiments are even better than that of the existing plastic tableware, indicating that the tableware of the embodiments can replace the existing plastic tableware as disposable tableware. Comparing embodiments 1 to 16 with comparison 5, the reduction rate of bending resistance force of tableware in embodiments 1 to 16 before and after immersing in water is lower than that of the existing molded fiber pulp tableware, and the strength stability is better.

Further, comparing the tableware in embodiment 4 with the tableware in comparisons 1 to 5, the property improvement is shown in table 14.

TABLE 14

| | | Compared properties | | | | |
|---|---|---|---|---|---|---|
| Code | Name | Bending resistance force test(kgf) before use | Bending resistance force test(kgf) after use | Bio-degradability assessment | Composting property assessment | Bending resistance |
| Comparison 2 | PET tableware | 1.1 | 1.1 | No bio-degradation 0% | 0% | 20% |
| Comparison 3 | PP tableware | 1.0 | 1.0 | No bio-degradation 0% | 0% | 25% |
| Comparison 4 | PLA tableware | 0.9 | 0.9 | Bio-degradable, degradation rate >90% | Home composting 0% | 20% |

TABLE 14-continued

| Code | Name | Bending resistance force test(kgf) before use | Bending resistance force test(kgf) after use | Bio-degradability assessment | Composting property assessment | Bending resistance |
|---|---|---|---|---|---|---|
| Comparison 1 | Common single-layer paper-board tableware on the market | 0.6 | 0 | Bio-degradable, degradation rate >90% | Home composting >90% | 15% |
| Comparison 5 | Molded fiber pulp tableware | 1.0 | 0.3 | Bio-degradable, degradation rate >90% | Home composting >90% | 10% |
| Embodiment 4 | Composite thermoformed tableware | 1.5 | 1.26 | Bio-degradable, degradation rate >90% | Home composting >90% | 70% |
| Improvement | | >50% | >26% | >90% | >90% | >50% |

As can be seen from table 14, the properties of the composite thermoformed tableware in embodiment 4 is greatly improved compared with the existing tableware, the biodegradation property is good, and it can be composted at home.

Finally, it should be emphasized that the invention is not limited to the above-mentioned embodiments. For instance, changes in the specific content of each component in the adhesive and the specific content of each component in the grease proofing layer, etc., shall also be included in the protection scope of the claims of the invention.

INDUSTRIAL APPLICABILITY

The present invention is used for preparing composite tableware, which can be a knife, a fork, a spoon, a bowl or a plate, etc., and can be used for holding food or drink, or used in situations when eating with tableware. A composite structure of the present invention is formed by thermoforming multiple layers of the same material or different materials, so that the thickness and strength of the tableware are higher. In the preheating step, heating makes self-adhesive materials sticky so as to be bonded with other forming materials, or heating reduces the moisture of the obtained composite material so as to increase the liquid absorption of the composite material to facilitate better adhesion of adhesive applied to the composite material. The product can be directly obtained by preheating first and thermoforming later, the surface of the product is smooth without wrinkles, the operation process is simple and does not need complex and complicated procedures, and the production cost can be better controlled. And environmental friendly composite tableware can be prepared by selecting environmental protective materials as forming materials.

The invention claimed is:

1. A preparation method of composite thermoformed tableware, comprising: a preheating step, a compositing step, and a thermoforming step in sequence;
   the preheating step comprises heating multilayer forming materials at a temperature of 35° C. to 150° C.; wherein the forming material is paper;
   the compositing step comprises stacking the preheated forming materials to form a composite material; and
   the thermoforming step comprises heat-pressing the composite material at a temperature of 80° C. to 150° C. and a pressure of 0.05 MPa to 0.5 MPa to form a three-dimensional body,
   wherein the thermoforming step comprises die cutting the composite material to size and entering the composite material into a thermoforming zone comprising a molding device to heat-press the composite material to form the three-dimensional body.

2. The preparation method of composite thermoformed tableware according to claim 1, wherein the forming material is self-adhesive, and the forming material is in a half molten state in the preheating step to be bonded with another forming material.

3. The preparation method of composite thermoformed tableware according to claim 1, wherein in the preheating step, an adhesive is coated between two adjacent forming materials; the adhesive comprises by mass 20% to 50% homopolyacrylate and 50% to 80% silica pigment, or the adhesive comprises by mass 50% to 95% PVA and 5% to 50% starch;
   the coating weight of the adhesive is 3 g/m² to 15 g/m².

4. The preparation method of composite thermoformed tableware according to claim 1, wherein after the thermoforming step, a grease proof layer is coated on the surfaces of the three-dimensional body, and the grease proof layer comprises by mass 1% to 50% starch, 50% to 98% polyacrylate emulsion and 1% to 3% alkyl ketene dimer emulsion, and the coating weight of the grease proof layer is 0.1 g/m² to 2 g/m².

5. The preparation method of composite thermoformed tableware according to claim 1, further comprising a drying step, which is carried out between the compositing step and the thermoforming step, and wherein the drying step comprises drying the composite material at a drying temperature of 100° C. to 200° C.

6. The preparation method of composite thermoformed tableware according to claim 1, wherein the composite thickness of the three-dimensional body is 100 μm to 10 mm, the bending resistance force of the three-dimensional body is 0.9 kgf to 2.0 kgf, and the plybond strength of the three-dimensional body is greater than 120J/m².

7. A preparation method of composite thermoformed tableware comprising a preheating step, a compositing step, and a thermoforming step in sequence;

the preheating step comprises heating multilayer forming materials at a temperature of 35° C. to 150° C.; the forming materials comprise one or at least two kinds of materials from paper, plastic and inorganic layer;

the compositing step comprises stacking the preheated forming materials to form a composite material; and the thermoforming step comprises heat-pressing the composite material at a temperature of 80° C. to 150° C. and a pressure of 0.05 MPa to 0.5 MPa to form a three-dimensional body;

wherein the preparation method is carried out by a compositing machine, which comprises a transferring mechanism, a preheating zone, a compositing zone and a thermoforming zone; the transferring mechanism comprises at least two unwinding devices, the preheating zone comprises at least two heating rollers, the compositing zone comprises a plurality of pressing rollers, and the thermoforming zone comprises a molding device; the forming materials are transferred to the preheating zone by the unwinding devices, the heating rollers heat the forming materials, the pressing rollers combine the multilayer forming materials, and the molding device carries out thermoforming on the composite material.

\* \* \* \* \*